Feb. 15, 1944.   W. J. FEDORCHAK ET AL   2,341,705
INDEXING MECHANISM
Filed May 1, 1941   5 Sheets-Sheet 1
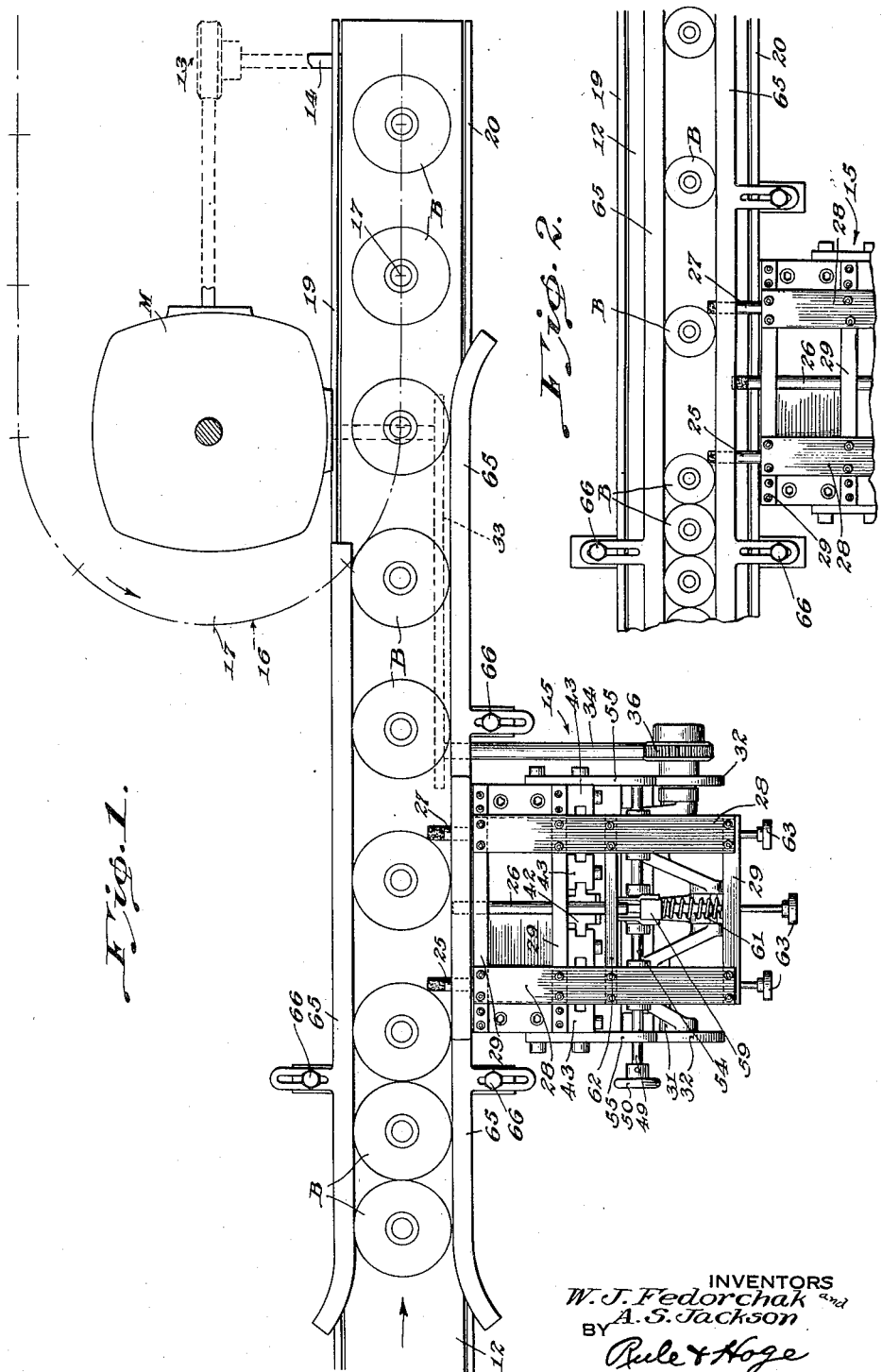
INVENTORS
W. J. Fedorchak and
A. S. Jackson
BY
Rule & Hoge
ATTORNEYS Feb. 15, 1944.   W. J. FEDORCHAK ET AL   2,341,705
INDEXING MECHANISM
Filed May 1, 1941   5 Sheets-Sheet 4

INVENTORS
W. J. Fedorchak and
A. S. Jackson,
BY
Rule & Hoge
ATTORNEYS

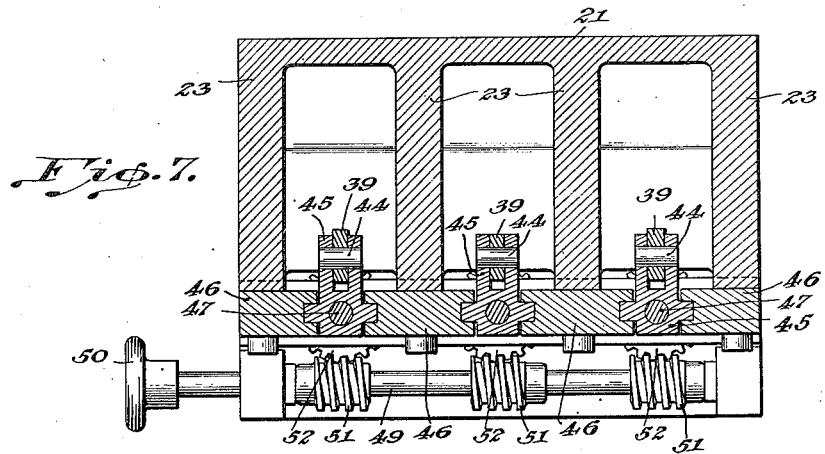
Fig. 7.
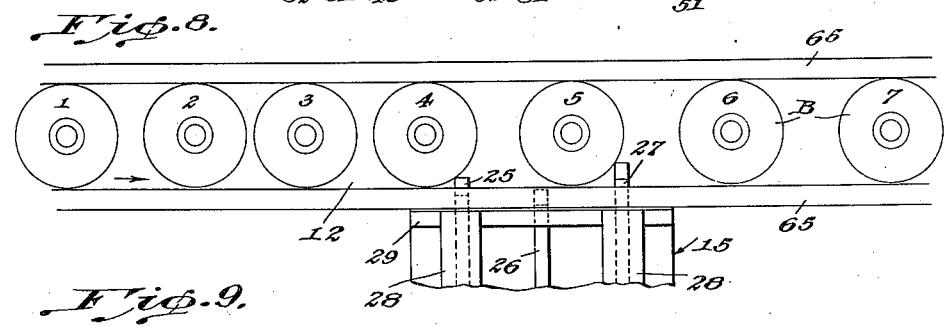
Fig. 9.
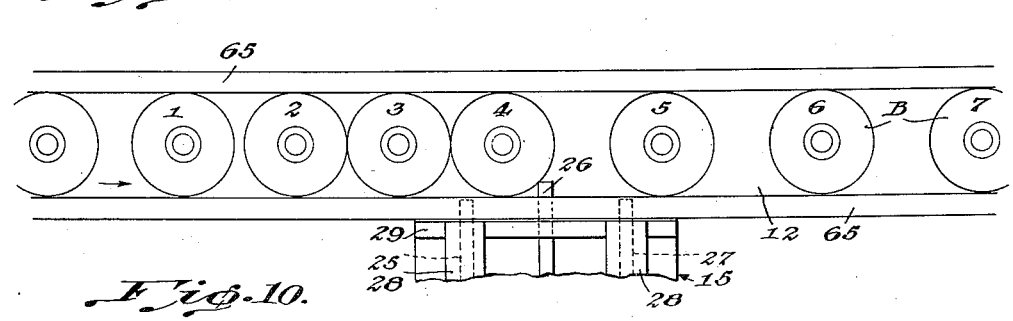
Fig. 10.
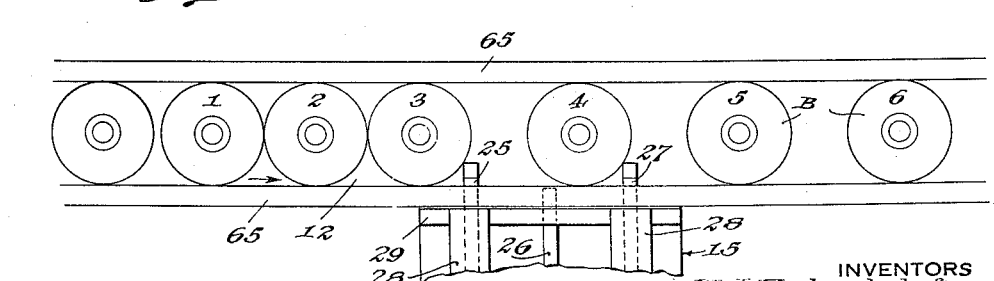

Patented Feb. 15, 1944

2,341,705

UNITED STATES PATENT OFFICE 2,341,705

INDEXING MECHANISM

William J. Fedorchak, Granite City, and Albert S. Jackson, Wood River, Ill., assignors to Owens-Illinois Glass Company, a corporation of Ohio Application May 1, 1941, Serial No. 391,385

10 Claims. (Cl. 198—34)

Our invention relates to mechanism for indexing articles carried on a traveling conveyor and more particularly to automatic mechanism for positioning and spacing bottles, jars, metal cans or other articles as they are carried along on a continuously traveling conveyor. An object of the invention is to provide apparatus by which such articles may be reliably and accurately spaced and positioned on the traveling conveyor.

A further object of the invention is to provide such an apparatus which is adapted for handling articles of different sizes or diameters.

A further object of the invention is to provide automatic mechanism by which either round, rectangular or other shaped articles may be accurately positioned and spaced on a traveling conveyor for cooperation with other traveling mechanisms or units which are separately mounted as, for example, bottle gauging units, filling nozzles or the like.

At the present day various operations such as gauging or testing bottles or other containers, filling such containers, capping or sealing them and other operations are carried on with automatic apparatus including traveling units which cooperate individually with the articles as the latter are advanced in a row on a traveling conveyor, the articles usually being spaced apart in the row in accordance with the spacing of the gauging, filling or other units. An object of the present invention is to provide means for positioning and spacing articles on a traveling conveyor for cooperation with such traveling units.

Other objects of the invention will appear hereinafter.

Referring to the accompanying drawings:

Fig. 1 is a plan view, partly diagrammatic, showing indexing mechanism adapted for spacing bottles or other articles on a traveling conveyor.

Fig. 2 is a fragmentary plan view showing the apparatus adjusted for operation with articles of a smaller diameter.

Figure 4:
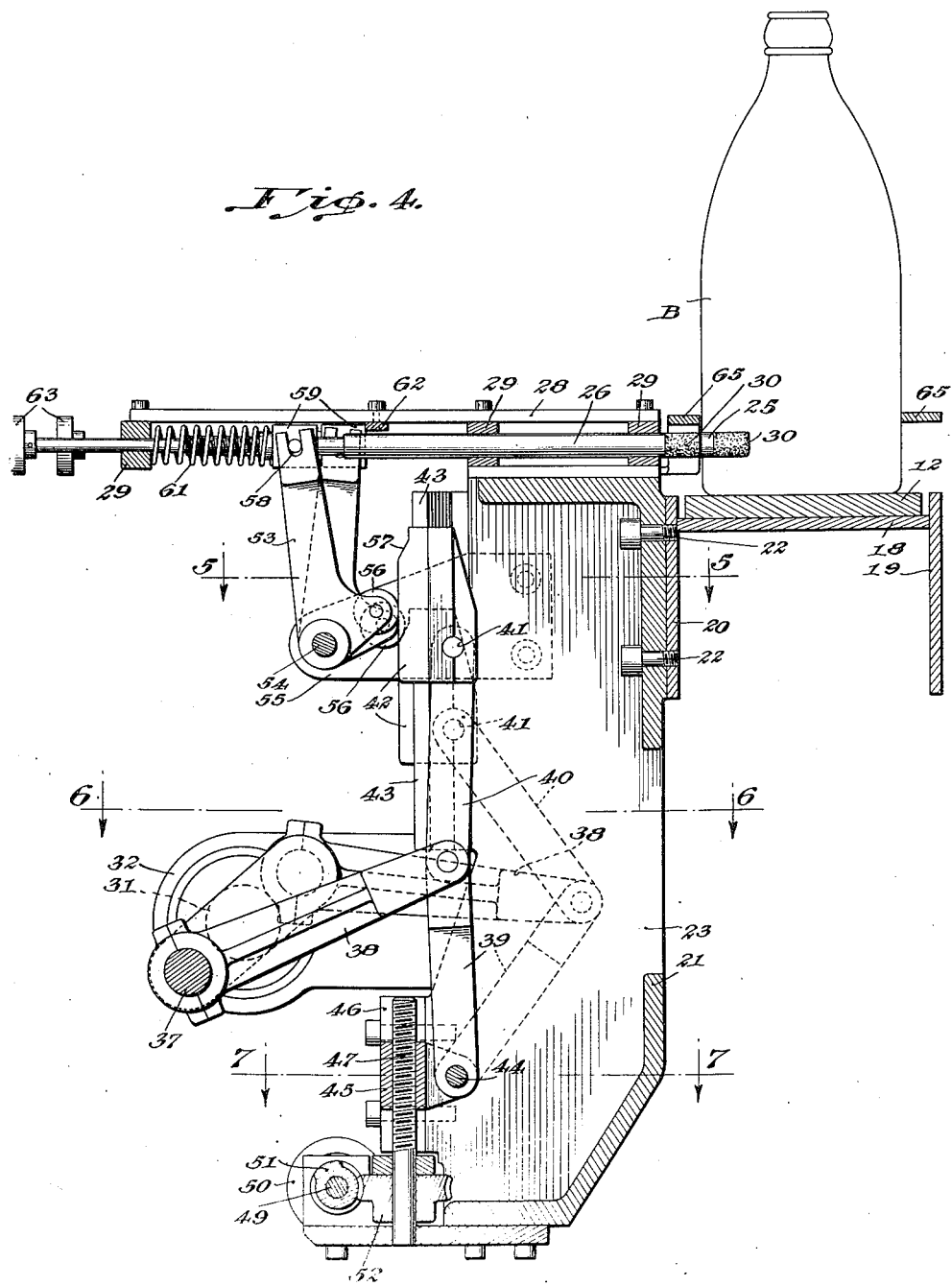
Fig. 4 is a sectional side elevation.
Figure 5:
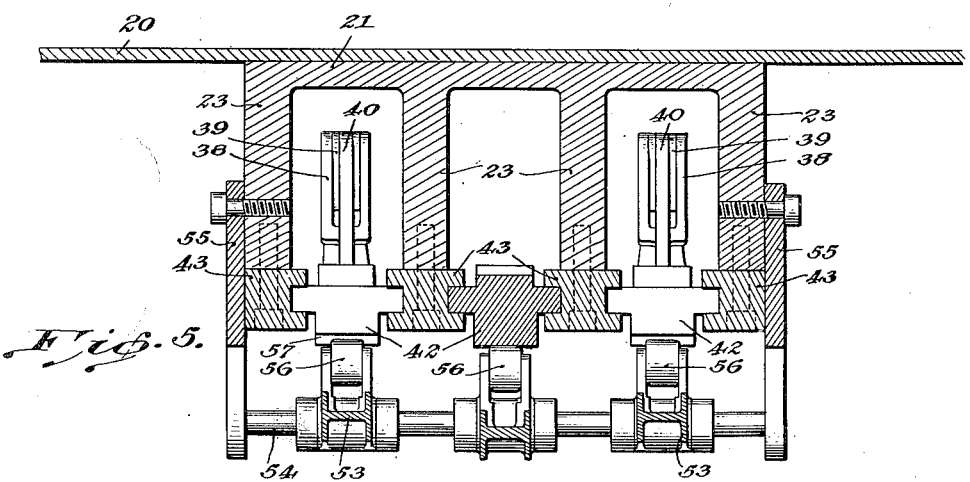
Figure 6:
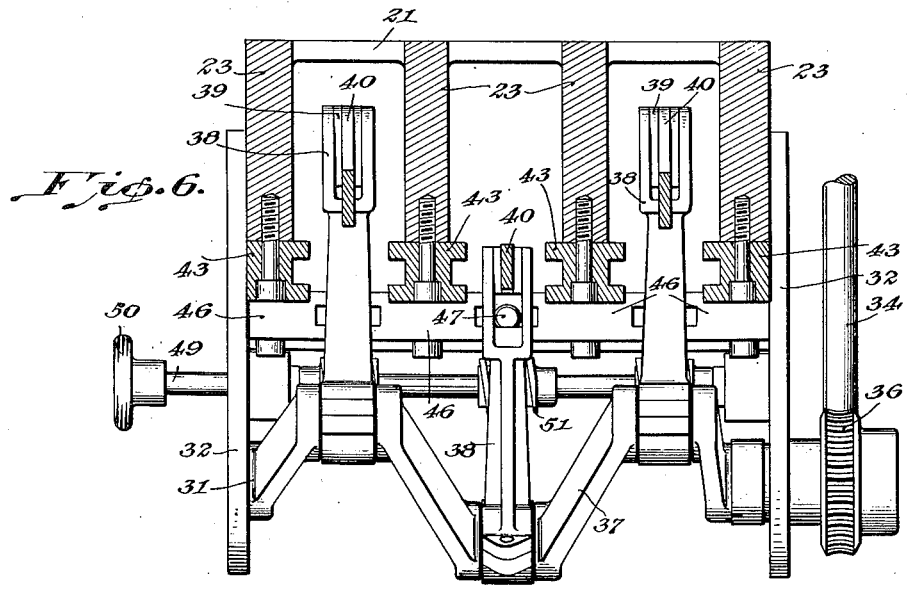

Figs. 5, 6 and 7 are sectional views taken respectively at the lines 5—5, 6—6 and 7—7 on Fig. 4.

Figs. 8, 9 and 10 are diagrammatic views showing a series of articles and the spacing fingers in various positions assumed progressively during the spacing operations.

The apparatus is herein illustrated and described as designed and used for positioning and spacing round bottles B on a continuously traveling conveyor. Referring particularly to Fig. 1, the bottles are advanced in a single row on a horizontal endless belt conveyor 12 which travels continuously. The conveyor may be driven as by means of a motor M having driving connections through worm gear mechanism 13 with the drive shaft 14 of the conveyor. The indexing mechanism 15 operates as hereinafter described to space the bottles at equal intervals and at predetermined positions on the conveyor for cooperation with other units as, for example, gauging units which may be mounted on or connected to travel with an endless carrier, indicated diagrammatically by the broken line 16. Such units are arranged at the positions 17 on said carrier and are brought in succession over the bottles B for cooperation therewith. The carrier 16 may be driven from the motor M in synchronism with the conveyor 12.

The conveyor frame includes a horizontal platform 18 (Fig. 4) beneath the traveling belt 12, and side plates 19 and 20. The indexing mechanism 15 includes a frame 21 attached by bolts 22 to the plate 20. The frame 21 comprises a series of vertically disposed parallel walls 23 (Figs. 5 to 7). Horizontal indexing rods or fingers 25, 26 and 27 are arranged at right angles to the conveyor belt and mounted for lengthwise reciprocating movement in a framework comprising longitudinal bars 28 and cross-bars 29, said framework being bolted to the main frame 21. The finger tips 30 may consist of rubber or similar material.

Figure 3:
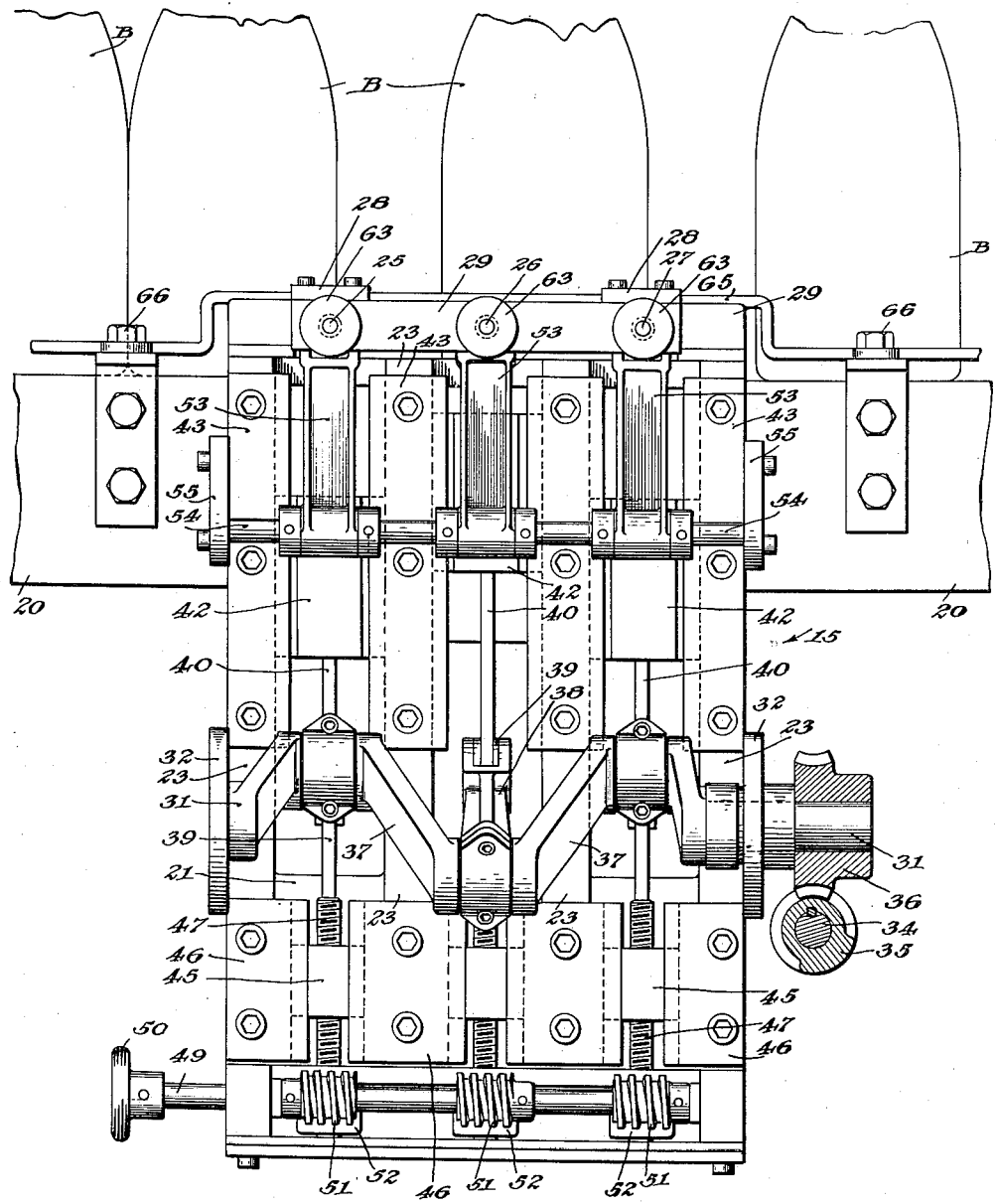
Fig. 3 is a part-sectional front elevation of the apparatus.

The indexing fingers are reciprocated automatically by mechanism including a crank shaft 31 journaled in arms 32 on the frame 21. The crank shaft is driven continuously by the motor M (Fig. 1) operating through driving connections which may include a sprocket chain 33 geared to a worm drive shaft 34 on which is a worm 35 (Fig. 3) driving a worm wheel 36 on the crank shaft. The crank shaft is formed with cranks 37 individual to the indexing rods. Each crank has operating connections with an indexing finger, including a connecting rod 38 pivoted at one end to the crank and at its opposite end pivotally connected to a pair of toggle links 39 and 40. The upper link 40 has a pivotal connection 41 with a cam slide block 42. The slide blocks 42 are mounted for vertical reciprocation in slideways formed in guide rails 43 bolted to the front faces of the walls 23. The links 39 have pivotal connections 44 at their lower ends with stationary heads 45 adjustable up and down between guide rails 46

(Figs. 3, 7) bolted to the walls 23. The means for adjusting the heads 45 includes vertical adjusting rods 47 having screw-threaded connection with said heads. A worm shaft 49 carrying a hand wheel 50 has attached thereto worms 51 which drive worm wheels 52 fixed to the shafts 47.

Operating connections between the cam slides 42 and the indexing rods include bell cranks 53 individual to said rods. The bell cranks are pivoted on a shaft 54 having a fixed mounting in bracket arms 55 on the frame 21. One arm of each bell crank carries a cam roll 56 which runs on the cam slide 42, the latter being formed with a cam surface 57. The other arm of the bell crank has a slot and pin connection 58 with a nut 59 screw-threaded for adjustment on the indexing rod. A coil spring 61, mounted on the rod, is held under compression between the nut 59 and a frame bar 29. Stops 62 in the path of the nuts 59, limit the inward movement of the indexing rods. Knobs 63 on the rods permit rotation thereof for adjusting them lengthwise in the nuts 59. Stationary guide rails 65 are positioned over the conveyor belt 12 and are adjustably secured to the conveyor frame by clamping bolts 66 extending through slotted lugs on the guide rails.

Fig. 2 shows the apparatus adjusted for indexing bottles of comparatively small diameter. The guide rails 65 are in this instance both adjusted inwardly to narrow the path therebetween to approximately the diameter of the bottles. The indexing fingers are also adjusted inwardly as required for indexing the smaller bottles, such adjustment being effected by rotating the knobs 63. The heads 45 may also be adjusted to adjustably regulate the length of time during each cycle that the indexing rods are held in their projected position. For example, if it is desired to increase the length of time the indexing rods are projected, the heads 45 are adjusted downwardly by means of the knob 50 and vice versa.

*Operation*

The operation is as follows: Referring to Fig. 1, the bottles B which are approaching the indexing device 15 are shown in contact with each other and those which have passed the indexing mechanism have been spaced thereby at intervals equal to the spacing of the units 17. The outer indexing fingers 25 and 27 are spaced between centers a distance equal to the desired spacing between bottle centers. This, for example, will be assumed to be six inches. The operating crank for the middle index finger 26 is directly opposite the other cranks, namely, 180° in advance, and is shown retracted and the outer fingers fully projected. The two bottles in contact with the outer fingers are therefore correctly spaced. As the outer fingers withdraw, the bottles advance. During this advance the middle finger is projected. The indexing mechanism goes through one cycle of movements in the same time that the belt 12 advances through the distance between the two units 17, that is, six inches, so that the middle finger 26 is projected and commences its return movement just as the oncoming bottle reaches a point midway between the outer fingers. The middle finger, therefore, merely touches the bottle without changing its position. Also, the bottle as it passes beyond the middle finger reaches the finger 27 just when the latter has again been projected and is ready to retract. The next succeeding bottle has in the meantime been arrested by the finger 25 and held stationary until the finger 25 is again retracted.

Referring now to Figs. 8, 9 and 10, we have illustrated a series of bottles numbered from 1 to 7 passing through the indexing station. The approaching bottles are in this instance spaced somewhat irregularly. The bottle 5 (Fig. 8) is held stationary by the projected finger 27 but the next succeeding bottle 4 has advanced beyond normal position and holds the finger 25 partially retracted against the tension of its spring 61 (Fig. 4). As the finger 27 recedes, the bottle 5 moves forward with the belt, being properly spaced behind the preceding bottle 6. The bottle 4, however, is held back by the finger 25 until the finger 27 has retracted to bring it even with the finger 25. The fingers 25, 27 then complete their retractive movement while the bottles advance. If the bottle 4 has not been fully spaced from the bottle 5, it is arrested by the middle finger 26 as shown in Fig. 9 until the bottle 5 has advanced to provide the correct spacing between the bottles 4 and 5 and thus correctly position the bottle 4 on the conveyor. The middle finger 26 now withdraws, permitting the bottle 4 to continue its forward movement while the finger 27 is again projected in time to check the position of the bottle as shown in Fig. 10. While the finger 26 is holding the bottle 4 (Fig. 9) the oncoming bottles 1, 2 and 3 move up to the Fig. 9 position in which 2, 3 and 4 are in contact. Additional fingers may be provided, if desired, as a further check to insure accurate positioning and spacing of the bottles although under ordinary conditions the three indexing fingers as illustrated are ample to insure accurate positioning and spacing of the bottles.

Modifications may be resorted to within the spirit and scope of our invention.

We claim:

1. The combination of a traveling conveyor, indexing mechanism comprising indexing rods spaced apart in the direction of travel of the conveyor, an intermediate indexing rod, said rods being perpendicular to the direction of travel of the conveyor, automatic means for periodically moving said first mentioned rods lengthwise into and out of the path of the articles carried on the conveyor, means for holding the intermediate rod stationary during said movement of the first mentioned rods, means for moving said intermediate rod lengthwise into and out of said path in alternation with said movements of the first mentioned rods, and means for holding the latter stationary during said movement of the intermediate rod.

2. The combination of a horizontally disposed conveyor, means for driving the conveyor, indexing mechanism comprising a series of horizontal parallel rods positioned at one side of the conveyor and extending perpendicular to the path of movement of the conveyor, a stationary frame in which said rods are mounted, and automatic means for periodically projecting said rods lengthwise into the path of articles carried on the conveyor and for retracting each said rod by a straight line movement in the direction of its own length.

3. The combination of a horizontally disposed conveyor, means for driving the conveyor, indexing mechanism comprising a series of horizontal parallel rods positioned at one side of the conveyor and extending perpendicular to the path of movement of the conveyor, a stationary frame in which said rods are mounted, and automatic means for periodically projecting said rods lengthwise into the path of articles carried on the conveyor and for retracting said rods by straight line movements, said rods including an outer pair projected and retracted as a unit, an intermediate rod projected and retracted in alternation with the projection and retraction of said pair, means for holding said pair stationary in their retracted position during the projecting and retracting of the intermediate rod, and means for holding the intermediate rod stationary during the projecting and retracting of said pair.

4. Indexing mechanism comprising a row of parallel rods, a supporting frame in which said rods are mounted for reciprocation in the direction of their length for projecting and retracting the rods, a crank shaft comprising cranks individual to said rods, cams individual to said cranks, operating connections between the cranks and said cams, and operating connections between the cams and said rods.

5. Indexing mechanism comprising a supporting frame, parallel indexing rods mounted in said frame for reciprocation in the direction of their length, a crank shaft comprising cranks individual to said rods, and mechanisms providing operating connections between the cranks and said rods, each said mechanism including a connecting rod, a pair of toggle links connected thereto, a cam slide connected to said links and formed with a cam surface, a bell crank actuated by said slide, and means connecting the bell crank to the indexing rod.

6. Indexing mechanism comprising a supporting frame, parallel indexing rods mounted therein for reciprocation in the direction of their length, a crank shaft comprising cranks individual to said rods, means providing operating connections between the cranks and said rods including connecting rods each connected at one end to a crank, pairs of toggle links, each pair connected to a said connecting rod, stationary heads individual to said pairs of toggle links and each connected to one link of the toggle, cam slides individual to the pairs of toggle links and connected to the other links of the toggles, and operating connections between the cam slides and the said indexing rods for actuating the latter.

7. Indexing mechanism comprising a supporting frame, parallel indexing rods mounted therein for reciprocation in the direction of their length, a crank shaft comprising cranks individual to said rods, means providing operating connections between the cranks and said rods including connecting rods each connected at one end to a crank, pairs of toggle links, each pair connected to a said connecting rod, stationary heads individual to said pairs of toggle links and each connected to one link of the toggle, cam slides individual to the pairs of toggle links and connected to the other links of the toggles, operating connections between the cam slides and indexing rods including bell cranks pivotally mounted on said frame and connected to said indexing rods, said cam slides operable positively to move the indexing rods in one direction, and springs arranged to move the indexing rods and bell cranks when the cam slide is moved in the opposite direction.

8. Indexing mechanism comprising a supporting frame, parallel indexing rods mounted therein for reciprocation in the direction of their length, a crank shaft comprising cranks individual to said rods, means providing operating connections between the crank and said rods including connecting rods each connected at one end to a crank, pairs of toggle links, each pair connected to a said connecting rod, stationary heads individual to said pairs of toggle links and each connected to one link of the toggle, cam slides individual to the pairs of toggle links and connected to the other links of the toggles, operating connections between the cam slides and the said indexing rods for actuating the latter, and means for adjusting said heads and thereby adjustably varying the times at which the indexing rods are actuated during a cycle of operations.

9. The combination with a horizontally traveling endless conveyor, means for continuously driving the conveyor, and stationary guide rails positioned over and extending lengthwise of the conveyor along opposite sides thereof for guiding articles supported on and carried along with the conveyor, of horizontal indexing rods having a stationary mounting and positioned at different points along the conveyor, said rods being perpendicular to the direction of travel of the conveyor, means operable independently of the articles on the conveyor for projecting said rods in straight lines in the direction of their length periodically and in a predetermined order of sequence into the path of the articles, and means for yieldingly holding said rods stationary in their projected position for predetermined time intervals, said yielding means permitting the rods individually to be held in a partially projected position by said articles during said time intervals when the said projecting movement of a rod has been interrupted by an article on the conveyor.

10. The combination with a traveling conveyor on which articles are being carried along, of rods having a stationary mounting at one side of the conveyor and positioned at different points along the conveyor, said rods extending in a direction perpendicular to the direction of travel of the conveyor, means operable automatically for periodically projecting said rods in the direction of their length to predetermined positions in which the forward ends of the rods are in the path of the articles, and means including springs for holding the rods in projected positions during predetermined time intervals, said springs permitting said rods to be held in intermediate positions during such time intervals when the articles on the conveyor are in a position to prevent the rods from moving to their fully projected position, said rods operable to hold the articles stationary while the rods are in said intermediate position.

WILLIAM J. FEDORCHAK.
ALBERT S. JACKSON.